United States Patent [19]

Kazmierczak et al.

[11] Patent Number: 5,537,272
[45] Date of Patent: Jul. 16, 1996

[54] SPINDLE BALANCE DEVICE FOR A HARD DISK DRIVE ASSEMBLY

[75] Inventors: Frederick F. Kazmierczak; Michael A. Maiers, both of San Jose, Calif.

[73] Assignee: Seagate Technology, Inc., Scotts Valley, Calif.

[21] Appl. No.: 237,191

[22] Filed: May 2, 1994

[51] Int. Cl.$^6$ .................................................. G11B 17/02
[52] U.S. Cl. ...................................... 360/99.08; 360/98.07
[58] Field of Search ............................ 360/97.01–99.12

[56] References Cited

U.S. PATENT DOCUMENTS 4,739,425  4/1988  Dierkes et al. ........................ 360/97

*Primary Examiner*—Robert S. Tupper
*Attorney, Agent, or Firm*—Flehr, Hohbach, Test, Albritton & Herbert

[57] ABSTRACT

A spindle balancing device (10) for a hard disk drive assembly (12) having a spindle (11) mounted for rotation about a longitudinal axis (13) thereof. The balance device (10) includes a rigid, substantially flat weight member (17) formed and dimensioned to movably mount to an end surface (15) of the spindle (10) in superimposed relation thereto, which positions a center of gravity (CG) of the weight member (17) on one side of the longitudinal axis (13). The weight member (17) includes a positioning structure formed to cooperate with a protruding inner lip portion (16) circumferentially extending around the longitudinal axis (13) from the end surface (15) to selectively position the center of gravity (CG) at a predetermined position relative the longitudinal axis (13). As a result, the combined moment of inertia about the longitudinal axis (13) of the spindle (11), a disk member (14) mounted to the spindle (11) and the balance device (10) is within a substantially small predetermined tolerance to promote spin balancing.

17 Claims, 2 Drawing Sheets

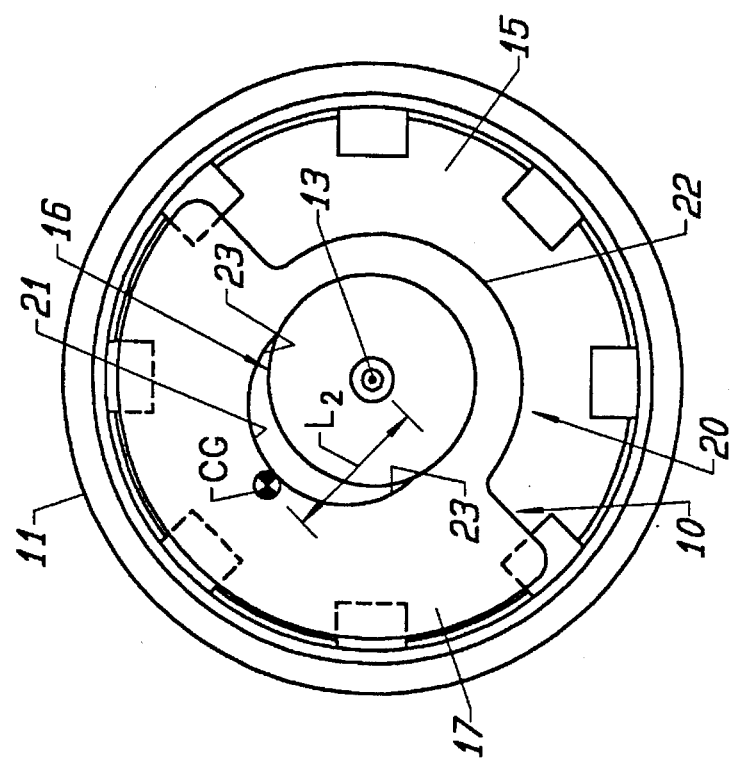
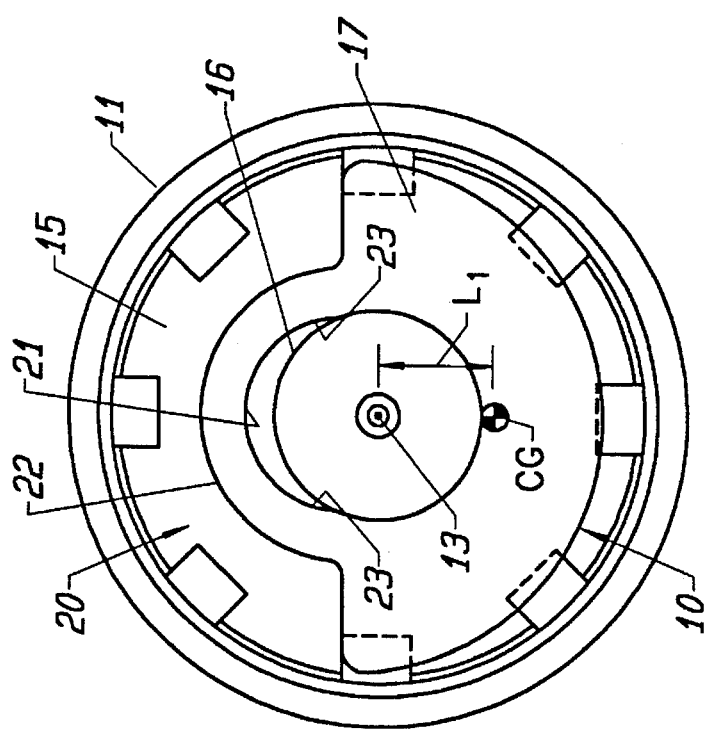

SPINDLE BALANCE DEVICE FOR A HARD DISK DRIVE ASSEMBLY

TECHNICAL FIELD

The present invention relates, generally, to disk drive apparatus, and, more particularly, relates to spindle balance devices for disk drives.

BACKGROUND ART

Through recent advances in the personal computer industry, it has become much more feasible to operate highly sophisticated software on these systems. For example, microprocessing speed, random access memory and hard disk storage space have all increased dramatically, among other advances, each of which aid processing. Hard disk storage space once considered ample would likely be inadequate to store some of the more sophisticated and storage consuming programs in use today.

While the storage capabilities of these hard disks have generally increased in storage capacity, their overall dimensions have typically decreased in size which is highly advantageous for use in laptop computers or the like. Part of the reason for these improvements is the technological advancement of read/write heads, servo motor control and servo systems which improves tracking. As a result, the density of the data tracks have substantially increased from about 500 tracks per inch (TPI) to about 3000 TPI which has allowed smaller diameter disks while increasing storage capacity.

Because of this increased track density, however, the importance of rotation trueness of the spindle and disks about a longitudinal axis thereof is magnified. Any wobble, deflection or non-repetitive run-out caused by an imbalanced or offset overall center of gravity from the longitudinal axis can significantly and adversely affect tracking performance. Thus, it is desirable to spin balance the spindle/disks combination in a manner reducing the combined moment of inertia thereof about the longitudinal axis to within an acceptable predetermined tolerance.

Typically, small lead weights of various mass, depending on the particular application, are mounted to a stamped disk mounting clamp employed to fix the disks to the spindle. This clamp includes a circumferentially extending trough formed to receive the weight therein which is situated a fixed distance from the longitudinal axis. An adhesive, as well as the trough walls forming the trough, retains the weight in place during operation once the exact weight and predetermined angle from a known point are determined.

While this balancing technique has been adequate to reduce the combined moment of inertia about the longitudinal axis to within a tolerable level, each application may require a different mass weight since the distance of the trough from the longitudinal axis is fixed. Hence, a plurality of different weights need to be stocked or the weights need to be cut to size for balancing purposes. Moreover, since lead is fairly malleable, these lead weights are easily deformed during installation and/or cutting which in a worse case scenario, alters the positioning of the center of gravity of the weight relative the longitudinal axis of the spindle.

More recently, heat shrink clamps have been employed in the newer disk drives which are unable, due to design, to provide the circumferential troughs to receive the balance weights. Merely mounting the weights, by adhesive, to the planar surface of the clamp has proven problematic due to the small surface area of the adhesive provided under the weight. Hence, there is a chance the weight may dislodge during operation which would not only cause tracking problems but also may damage the electronics and/or mechanisms inside the hard disk drive.

DISCLOSURE OF INVENTION

Accordingly, it is an object of the present invention to provide a spindle balance device for spin balancing the spindle and mounted disks for reducing wobble, defection or non-repetitive run-out.

Another object of the present invention is to provide a spindle balance device which can be attached to the spindle regardless of the disk mounting clamp.

Still another object of the present invention is to provide a single spindle balance device capable of radial positioning relative one end of the spindle to a balance the spindle in most situations.

It is a further object of the present invention to provide a spindle balance device which is durable, compact, easy to maintain, has a minimum number of components, and is easy to use by unskilled personnel.

In accordance with the foregoing objects, the present invention provides a spindle balancing device for a hard disk drive assembly having a spindle mounted for rotation about a longitudinal axis thereof. The spindle includes at least one disk member mounted thereto, and provides an end surface with a protruding inner lip portion circumferentially extending around the longitudinal axis. The balance device includes a rigid, substantially flat weight member formed and dimensioned to movably mount to the end surface of the spindle in superimposed relation thereto. A center of gravity of the weight member is formed to be positioned on one side of the longitudinal axis. The weight member includes a positioning structure formed to cooperate with the inner lip portion to selectively position the center of gravity at a predetermined position relative the longitudinal axis. Hence, the combined moment of inertia of the spindle, the disk member and the balance device about the longitudinal axis is within a substantially small predetermined tolerance to promote spin balancing.

The positioning structure is provided by an oblong aperture extending through the weight member which is formed for rotating and sliding receipt of the lip portion therein between a first position and a second position. In the first position, the center of gravity of the weight member is placed toward or closer to the longitudinal axis which effectuates a lighter weight; while in the second position, the center of gravity is placed away or further from the longitudinal axis which effectuates a heavier weight for balancing.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIGS. 3A and 3B are a series of top plan views of the spindle balancing device of the present invention illustrating the two mounting positions on the spindle.

BEST MODE OF CARRYING OUT THE INVENTION

Figure 1:
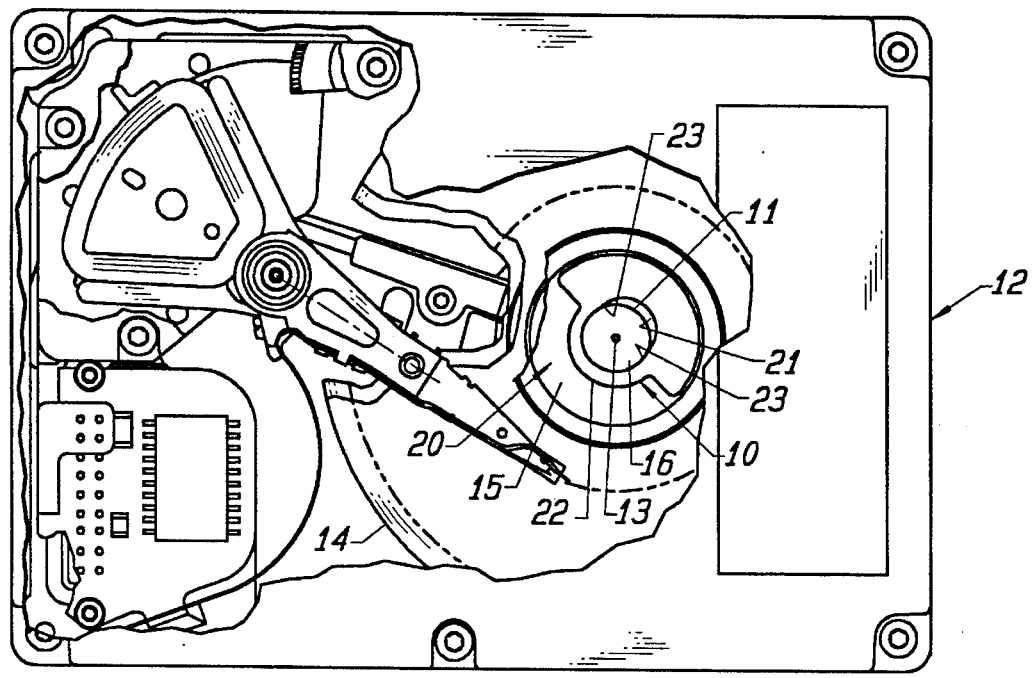
FIG. 1 is a top plan view of a hard disk drive assembly employing a spindle balance device constructed in accordance with the present invention.

While the present invention will be described with reference to a specific embodiment, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Figure 2:
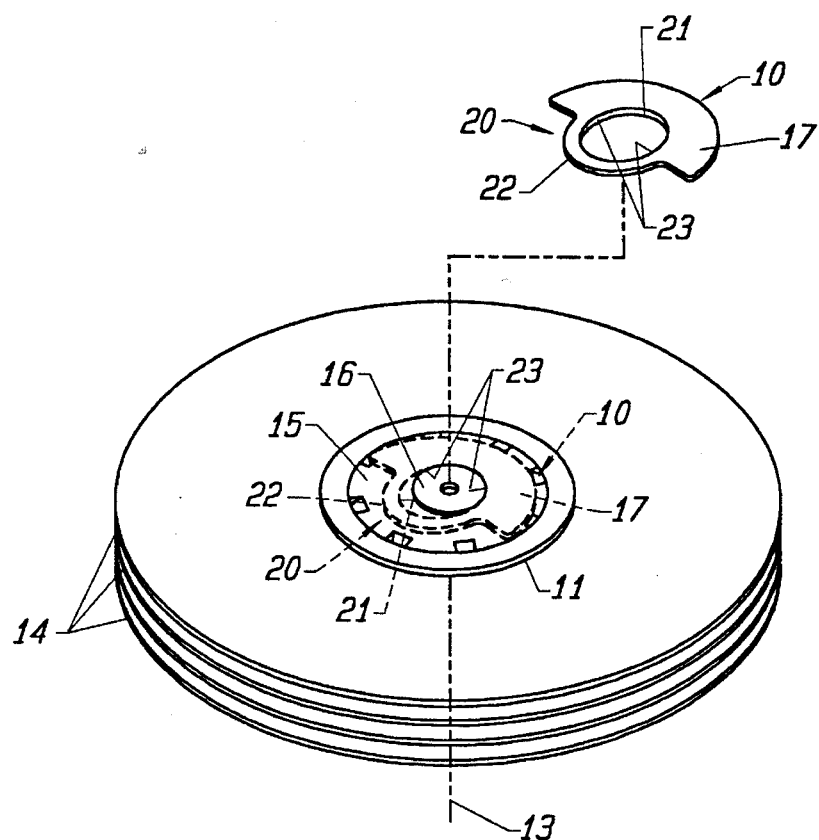
FIG. 2 is an exploded top perspective view of a spindle and plurality of mounted disks having the spindle balance device of the present invention mounted thereto.

Attention is now directed to FIGS. 1 and 2 where a spindle balancing device, generally designated 10, is shown mounted to a spindle 11 of a hard disk drive assembly 12. Briefly, spindle 11 is mounted for rotation about a longitudinal axis 13 extending therethrough, and includes at least one disk member 14 mounted to the outer cylindrical surface of the spindle. An upper end surface 15 of spindle 11 provides a protruding inner lip portion, generally designated 16, circumferentially extending around longitudinal axis 13. Balance device 10 includes a rigid, substantially flat weight member, generally designated 17, formed and dimensioned to movably mount to end surface 15 of spindle 11 in superimposed relation thereto. A center of gravity (CG) (FIGS. 3A and 3B) of weight member 17 is formed to be positioned on one side of longitudinal axis 13. Further, weight member 17 includes a positioning structure 20 formed to cooperate with inner lip portion 16 to selectively position the center of gravity (CG) at a predetermined position relative the longitudinal axis. Hence, at this predetermined position, a combined moment of inertia of spindle 11, disk member 14 and balance device 10 about longitudinal axis 13 is within a substantially small predetermined tolerance to promote spin balancing.

Further, in accordance with the present invention, positioning structure 20 is provided by an oblong aperture 21 extending through weight member 17 which is formed for rotating and sliding receipt of lip portion 16 therein between a first position (FIG. 3A) and a second position (FIG. 3B). In the first position, the center of gravity (CG) of the weight member is placed toward or closer to the longitudinal axis which effectuates a lighter weight; while in the second position, the center of gravity (CG) is placed further away from the longitudinal axis which effectuates a heavier weight for balancing. Accordingly, the present invention permits the weight member to be mounted at a plurality of positions radially about the longitudinal axis for the correct placement the weight to counter the off-set. Further, the balance device can be mounted at a plurality of positions toward and away from the longitudinal axis to effectuate a lighter or heavier weight. Hence, wobble, deflection, or non-repetitive run-off can be substantially reduced to tolerable levels using a single weight member, as opposed cutting the weights to size or stocking a plurality of weights as the prior art devices required.

Weight member 17, as shown in FIGS. 3A and 3B, is irregularly shaped relative to its positioning aperture 21 so that its center of gravity can be easily moved around the center axis of spindle 13. The member is preferably provided by a semicircular flat sheet-like weight, which is preferably 3–5 mils thick and about 10–20 mg in weight. It will be appreciated, of course, that other flat shapes can be employed without departing from the true spirit and nature of the present invention. Further, unlike the lead weights employed in the prior art, the substantially rigid weight member, preferably steel or the like, resists deformation during handling and installation which increases durability and more accurate positioning of the center of gravity (CG).

Spindle end surface 15, as best viewed in FIG. 2, is substantially planar and includes the generally circular and raised lip portion 16 extending outwardly therefrom. Lip portion 16 cooperates with positioning structure 20 of weight member 17 to selectively position the center of gravity (CG) at the predetermined positions, above-discussed, relative longitudinal axis 13. A loop portion 22 of positioning structure 20 forms an oblong or eccentric aperture 21 extending through weight member 17 which is formed to receive lip portion 16 for sliding and rotating placement of weight member 17 relative spindle end surface 15.

Using a spin balancing apparatus (not shown), well known in the industry, and a given weight (i.e., the weight of balance device 10), the precise angle of placement of the CG relative a predetermined location, and the distance of the CG from the longitudinal axis can be easily calculated. This calculation is, of course, a function of the off-set of the spindle, as well as that of the generally stacked, vertically spaced-apart disk members 14 (FIG. 2).

FIGS. 3A and 3B illustrate that aperture 21 of positioning structure 20 permits the center of gravity (CG) to be radially positioned about longitudinal axis 13 at the precalculated position. Further, the oblong or eccentric nature of aperture 21 permits weight member 17, and hence, the CG, to slide toward or away from the longitudinal axis, along opposed walls 23 of aperture 21, between the first position (FIG. 3A) and the second position (FIG. 3B). Unlike the prior art assemblies in which the weight receiving trough remained a fixed distance from the longitudinal axis, the present invention permits the weight member CG to be repositioned either closer to the longitudinal axis (i.e., the first position) or farther away from the longitudinal axis (i.e., the second position).

The first position is employed when there is a relatively low value of imbalance which effectuates the necessary lighter weight at the precalculated angle. In contrast, the second position is employed when there is a relatively high value of imbalance which effectuates the necessary heavier weight at the precalculated angle. Essentially, the distance ($L_1$) between the CG and longitudinal axis 13 in the first position (FIG. 3A) is less than the distance ($L_2$) between the CG and longitudinal axis 13 in the second position (FIG. 3B) which induces a greater counterbalancing effect on the combined moment of inertia.

It has further been found that these two positions are generally adequate in most situations to reduce the combined moment of inertia of the spindle, the storage disks, and the weight member about the longitudinal axis to within the predetermined tolerance. Accordingly, the present invention is generally bi-modal (i.e., the first position and the second position) to further simplify installation and processing. It will be understood, however, that the weight member may be positioned anywhere between the first position and the second position for greater accuracy without departing from the true spirit and nature of the present invention.

To mount weight member 17 to end surface 15, in the preferred embodiment, an underside surface of the weight member includes an adhesive which mounts the weight member to planar end surface 15 once the correct placement has been established. Since the adhesive is applied to a substantial portion, if not all, of the weight member underside, the probability of dislodging the weight member from the end surface when in operation is relatively slim. Moreover, the relative thinness of weight member 17 assures that it maintains a low profile to avoid contacting other objects which may further cause dislodging.

What is claimed is:

1. A spindle balancing device for a disk drive assembly having a spindle mounted for rotation about a longitudinal axis thereof, said spindle having at least one disk member mounted thereto, and having an end surface with a protruding inner lip portion circumferentially extending around said longitudinal axis, said balance device comprising:

a rigid, substantially flat weight member formed and dimensioned to movably mount to said end surface of said spindle in superimposed relation thereto with a center of gravity of said weight member positioned on one side of said longitudinal axis, said weight member having a positioning structure including an aperture larger than the protruding inner lip portion and extending through said balance device and surrounding said protruding inner lip portion to allow selective positioning of said center of gravity of said weight member at predetermined positions relative said longitudinal axis such that a combined moment of inertia of said spindle, said disk member and said balance device about said longitudinal axis is within a substantially small predetermined tolerance.

2. The spindle balance device as defined in claim 1 wherein, said end surface of said spindle is substantially planar.

3. The spindle balance device as defined in claim 2 wherein, said predetermined position of the center of gravity is located substantially within a plane containing said spindle planar surface.

4. The spindle balance device as defined in claim 3 wherein, said protruding inner lip portion is circular, and said aperture of said positioning structure is oblong-shaped to allow rotating and sliding between a first position, placing said center of gravity toward said longitudinal axis, and a second position, placing said center of gravity away from said longitudinal axis.

5. The spindle balance device as defined in claim 4 wherein, said weight member is semi-circular shaped.

6. The spindle balance device as defined in claim 1 wherein, said spindle is cylindrical shaped.

7. The spindle balance device as defined in claim 1 wherein, an underside surface of said weight member includes an adhesive for mounting to said spindle surface.

8. In a disk drive assembly having a motor apparatus operably coupled to a cylindrical shaped spindle for rotation about a longitudinal axis thereof, said spindle having at least one disk is mounted thereabout, and having one end thereof with a protruding inner lip portion circumferentially extending around said longitudinal axis, an improvement comprising:

a rigid, substantially flat balance device formed and dimensioned to movably mount to said spindle end surface in superimposed relation with a center of gravity of said balance device on one side of said longitudinal axis, said balance device including an aperture larger than the protruding lip portion and extending through said balance device for rotating and sliding receipt of said lip portion therethrough for cooperation therewith to selectively position a center of gravity of the balance device at predetermined positions relative said longitudinal axis and substantially within a plane containing said spindle planar surface such that a combined moment of inertia of said spindle, said disk member and said balance device about said longitudinal axis is within a substantially small predetermined tolerance.

9. The improvement in said disk assembly as defined in claim 8 wherein, said end surface is generally planar.

10. The improvement in said disk assembly as defined in claim 8 wherein, said inner lip portion is circular-shaped, and said aperture is oblong-shaped for sliding and rotating cooperation with said lip portion between a first position, placing said center of gravity toward said longitudinal axis, and a second position, placing said center of gravity away from said longitudinal axis.

11. The spindle balance device as defined in claim 8 wherein, said balance device is semi-circular shaped.

12. The spindle balance device as defined in claim 8 wherein, an underside surface of said balance device includes an adhesive for mounting to said spindle surface.

13. The spindle balance device as defined in claim 8 wherein, said balance device is composed of steel.

14. A rigid, irregularly shaped substantially flat balance device formed and dimensioned to movably mount to the spindle of a disc drive, said spindle having a planar surface with a protruding lip portion, said disc drive also having a motor apparatus operably coupled to said spindle for rotation about a longitudinal axis thereof, said spindle having at least one disk mounted thereabout, said device being mounted in superimposed relation to said spindle surface with a center of gravity of said balance device on one side of said longitudinal axis, said balance device including an aperture larger than the protruding lip portion and extending through said balance device for receipt of said protruding lip portion therethrough for cooperation therewith to selectively position said center of gravity of the balance device at predetermined positions relative said longitudinal axis and substantially within a plane containing said spindle planar surface such that a combined moment of inertia of said spindle, said disk member and said balance device about said longitudinal axis is within a substantially small predetermined tolerance.

15. The spindle balance device as defined in claim 14 wherein, said balance device is generally planar and semicircular shaped, said center of gravity being within said semicircular shape.

16. The improvement in said disk assembly as defined in claim 14 wherein, said aperture is oblong-shaped for sliding and rotating cooperation with said spindle between a first position, placing said center of gravity toward said longitudinal axis, and a second position, placing said center of gravity away from said longitudinal axis.

17. A rigid, substantially flat weight member formed and dimensioned to movably mount to an end surface of a spindle in a disk drive assembly having said spindle with a protruding lip portion, said spindle mounted for rotation about a longitudinal axis thereof, said spindle having at least one disk member mounted thereto, said weight member being adapted to be mounted in superimposed relation to said disc member with a center of gravity of said weight member positioned on one side of said longitudinal axis, said weight member having a positioning structure including an aperture larger than the protruding lip portion and extending through said balance device and surrounding said protruding lip portion to selectively position said center of gravity of said weight member at predetermined positions relative said longitudinal axis such that a combined moment of inertia of said spindle, said disk member and said balance device about said longitudinal axis is within a substantially small predetermined tolerance.

* * * * *